June 16, 1964    P. J. RIEPPEL ET AL    3,137,782
PROCESS FOR WELDING THICK MATERIALS
Filed Oct. 23, 1962

Perry J. Rieppel
Glenn E. Faulkner    Inventors
Jerome W. Nelson

By  *Elwin M. Thomas*    Attorney

United States Patent Office 3,137,782
Patented June 16, 1964

3,137,782
PROCESS FOR WELDING THICK MATERIALS
Perry J. Rieppel, Worthington, and Glenn E. Faulkner and Jerome W. Nelson, Columbus, Ohio, assignors, by mesne assignments, to Esso Research and Engineering Company, Elizabeth, N.J., a corporation of Delaware
Filed Oct. 23, 1962, Ser. No. 232,451
8 Claims. (Cl. 219—61)

The present invention relates to a process for welding thick materials such as heavy wall pipe, thick plates and the like. It has particular application to the welding of iron and steel pipes and other shapes, but is applicable also to materials containing metals other than iron or steel.

While the invention is particularly applicable to the formation of girth joints in large pipe lines, it can be employed in joining the edges of flat or curved plates, e.g., in construction of tanks and vessels and other structures of wall or plate thickness exceeding ¼" and up to 1" or more.

The present invention takes advantage of a discovery which forms the basis for a co-pending patent application, U.S. Serial No. 825,159, filed July 11, 1959, now Patent No. 3,084,246, by the present inventors and an additional co-inventor. In such application it is pointed out that by the formation of a narrow welding gap of precisely controlled dimensions, the gap having a width usually substantially narrower than its depth, a continuous weld may be made rapidly. By continuously feeding a wire electrode into the gap, which gap is of rather accurately controlled width and uniformity, and by maintaining a continuous or substantially continuous arc, which arc is located substantially in the middle of the thickness of the material being welded, a superior weld using relatively small quantities of weld material is formed.

According to the present invention, the principles of the invention described in the said co-pending application may be extended to the welding of materials which are entirely too thick for complete welding in a single pass. The co-pending application is directed primarily to single pass welding, although not entirely limited thereto. For materials of thickness up to about ¼" or 5/16", single pass welding is very efficient. For thicker structures, and in special cases for structures of ¼" thickness or slightly less, multiple pass welding may be necessary or desirable. It is an object of the present invention to facilitate welding of such materials, which will be referred to herein as thick materials, with a minimum number of passes. This is accomplished with a near-minimum consumption of welding material, and with production of efficient and securely welded joints capable of withstanding powerful disruptive forces such as high pressures and other stresses.

Referring to the drawings, FIG. 1 shows a pair of shapes, such as the abutting ends of sections of heavy wall pipe, e.g., of iron or steel, brought into adjoining positions preparatory to welding.

Figure 1:
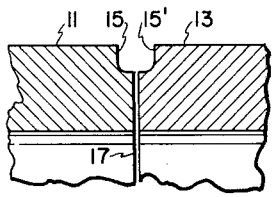
FIG. 1A shows an alternative arrangement for welding joints which are too thick, but only by a small margin, for single pass welding.
Figure 2:
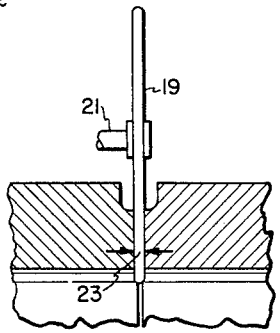
FIG. 2 shows a typical preparatory step applied to the parts of FIG. 1.
Figure 5:
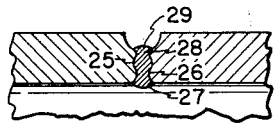
Figure 6:
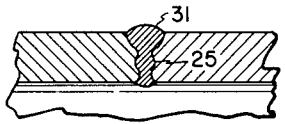

FIGS. 5 and 6 respectively show first stage and completed welds on structures of the type shown in FIGS. 1 and 2.

Figure 3:
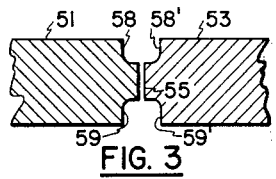
FIGS. 3 and 4 show respectively a pair of shapes brought into abutment and a preparatory step prior to welding as applied to materials wherein the inner thickness is entirely too great for single pass welding.
Figure 4:
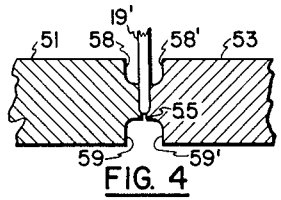
Figure 7:
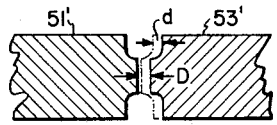
Figure 8:
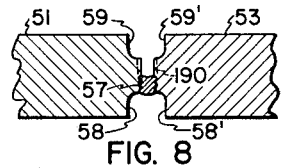

FIGS. 7 and 8 respectively show further stages in the welding of very heavy materials of the types shown in FIGS. 3 and 4.

Figure 9:
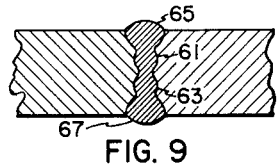

FIG. 9 shows a completed weld in a structure of the type shown in FIGS. 3, 4, 7 and 8.

Figure 10:
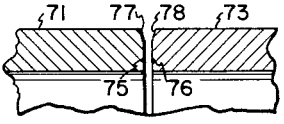
Figure 11:
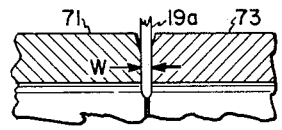
Figure 12:
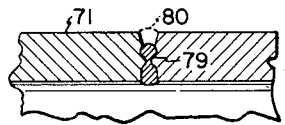

FIGS. 10, 11 and 12 respectively show steps of a modified welding process including the preparatory spacing or cutting step, some of the steps being alternatives for the operations shown in FIGS. 1, 2 and 5.

Referring first to FIG. 1, two bodies to be welded are indicated at 11 and 13. As illustrated, these are the adjoining end portions of sections of pipe or heavy tubing which are to be joined by a girth weld. Each of the pipe ends is chamfered or rebated, as indicated at 15, 15', and the pipe sections are brought substantially into abutment. As shown, a small gap 17 may be permitted between them and, in fact, often will be necessary in the case of pipes of large diameter inasmuch as perfect abutment becomes increasingly difficult as the diameter of the pipe increases. In cases where the pipes are finished with ends precisely perpendicular to their axes, the width of the space 17, as the sections are brought together, may be substantially zero.

Assuming that the pipe walls 11, 13 are too thick for single pass welding (and a single pass weld of about 5/16" in mild steel pipe is about the greatest that has been proved so far to be practicable, using the continuous arc and thin wire electrode procedure though under special conditions thicker single pass welds can be accomplished in some cases), a gap of rather accurately uniform width must be formed between the abutting ends. For this purpose a cutting wheel or disc of proper thickness to give the desired spacing preferably is employed, as shown in FIG. 2. This abrasive cutting disc or wheel 19, mounted on a supporting shaft or hub 21, is driven by appropriate power means and is preferably carried in planetary motion around the axis of the pipe to cut out the gap 17 to the desired width 23, FIG. 2. Alternatively, the pipe may be rotated with respect to the cutter, as is feasible in "double jointing" operations, but usually not practical in field pipe line welding. It will be understood that the abutting pipe ends are, and must be, firmly held in fixed position by a suitable clamping mechanism (not shown). The thus provided groove or spacing 23 may be cut only part-way around the joint and welding commenced before the joint is completely cut around the circumference. Such an arrangement reduces the clamping effort required to hold the parts in perfect alignment during welding. However, with suitable, adequately strong, and firm clamping equipment the joint, in some cases, can be cut completely through 360° of the pipe periphery before welding commences.

Referring now to FIG. 5, a first pass weld is made in the groove 23 provided by the cutter of FIG. 2. This weld is characterized by having a thickened portion at its mid- or upper mid-section, as indicated by 25. This is due to the fact that the welding arc is substantially concentrated at the center of the thickness of the portion being actually welded at this pass. Heat flows less rapidly away from the corners or edges than from the mid-section. Hence these corners tend also to be fused back and to recede farther than the metal body 26 farther from the corners. Hence the weld structure is characterized by a cross-section of relatively wider base element 27 and usually a slightly wider top or outer element 29 above a waste portion 28. The weld produced characteristically has a sort of double hourglass configuration in section. This is shown clearly in FIG. 5 and is referred to in greater detail in the co-pending application mentioned above, and is claimed in a divisional application thereof, Serial No. 216,792, filed August 14, 1962.

After the inner weld 25, 27, 28, 29 is completed, normally by single pass operation, the space between the rebated portions 15, 15' is filled by a second pass indicated in typical cross-sectional form at 31 in FIG. 6. The latter weld pass can be deposited by any suitable apparatus or can be deposited manually. The inner weld is sufficiently strong to hold the joint against all normal strains and a pipe line, for example, can be laid for some distance ahead, secured merely by the inner pass welding of FIG. 5. Thereafter the second pass welding at each joint can be performed at the convenience of the operators without holding up the production of welded pipe line in the field. The welding of girth joints in pipe lines is frequently the "bottleneck" in long line welding operations. The procedure so far described tends to eliminate such bottlenecks and to facilitate rapid pipelining.

Figure 1A:
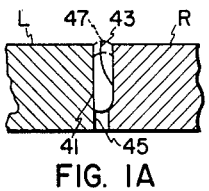

Referring next to FIG. 1A, there is shown a joint of single J configuration. Here one of the elements to be joined has an essentially perpendicular wall 41 and the other has a J form of cut 43. The J configuration serves two functions: one to maintain proper spacing of the welding groove, and the second to control weld penetration. Where the wall thickness is slightly greater than that which can be welded in a single pass by ordinary methods, a very satisfactory weld may be produced by employing the single J configuration. A welding rod is fed into the groove and an arc maintained near the bottom thereof so that the narrow land portion 45 on the right section L of the joint is fused to the base of the perpendicular wall 41 of the left section. The same welding pass fills the groove to its top, as indicated by dotted lines 47. This type of weld is suitable for bodies of up to moderately thick section.

It will be understood at this point that although the discussions above have mentioned the welding of girth joints between the ends of thick walled pipe, the invention is not limited to pipe welding. It is equally applicable to joining the edges of flat or curved plates or sheets and other shapes of similar thickness. These comments refer also to the further modifications of the invention which follow.

Referring now to FIG. 3, there are shown two adjoining shapes 51 and 53 respectively. These may represent elements of pipe or of other structures. Where their formation permits and where careful control over position can be maintained, these may be brought into accurately spaced position with respect to each other, leaving a gap 55 of suitable width (preferably 0.050 to 0.080") suitable for direct, continuous arc welding using thin wire type electrodes as previously described. In this case the cutting or spacing step of FIG. 2 or of FIG. 4 may be omitted. As a rule, however, it has been found to be very difficult and often impossible to obtain and maintain by mechanical spacing, the necessary uniformity of gap width 55 required for efficient, rapid, continuous welding. Hence a preparatory step such as the cutting operation, which is presently preferred, is necessary.

As shown in FIG. 4, a gap-forming device such as a cutting disc or wheel like that of FIG. 2, shown fragmentarily at 19', is employed to cut a groove or kerf as deeply into the material as can be efficiently welded in a single pass operation. This depth usually has a maximum of the order of about 5/16" or in some cases slightly less. The gap is cut to the proper depth, and kept uniform in both width and depth, with in the tolerances of good equipment, i.e., usually within about .005" or less in either dimension. This portion of the joint is then welded by a single pass operation analogous to that shown in FIG. 5 and having the same general cross-sectional characteristics. See also FIG. 8 where the first weld deposition is indicated at 57, the parts being relatively inverted as compared to FIG. 4.

After the cutting operation has been performed, the weld is deposited to the required depth and then a second cutting operation is performed, as indicated in dotted lines 190 in FIG. 8. This preferably involves cutting slightly into the first weldment 57 so as to be certain that a complete and continuous joint will be formed throughout the thickness of the material.

It will be noted that the plates or shapes 51, 53 are chamfered on both edges, as indicated at 58, 58' and 59, 59' respectively. Thus, chamfered or rebated portions will be filled in by a subsequent pass analogous to the weld 31 of FIG. 6.

Referring now to FIG. 7, similar operations are performed on members 51'–53', but in this modification the parts are first brought into abutting position and then deliberately moved apart mechanically a distance d such that a welding space of optimum dimensions indicated at D is provided. In other words, the spacing required for the weld is obtained by mechanical movement and rigid holding of the parts to be welded, rather than by cutting. Welding then may proceed in either one or two steps, as required, to fill in the central portion of the joint, the number of passes depending obviously upon the thickness of the material. It will be noted that the procedure of FIG. 7 requires careful and exact preshaping of the adjoining edges so that the gap D will always be of proper width for forming the weld. It should be noted throughout that the maintenance of a uniform gap width, within rather close tolerances, of 0.005", and preferably within ±0.0015" or so, is needed.

FIG. 9 shows a completed weldment in a joint of the type described in FIGS. 3, 4, 7 and 8. Depending on the number of passes, this configuration will vary somewhat, but it is typically characterized by having at least one or two and usually more thickened portions 61, 63 analogous to the thick central portion 25 of the weldment shown in FIG. 5. The inner and outer welds shown at 65, 67 are less critical as to their cross-section and can be formed in any suitable way as was the case with the weld portion 31 of FIG. 6.

FIG. 10 shows a joint between pipe ends 71, 73 characterized by vertical end portions 75, 76 and a V-groove formed by the sloping outer portions 77, 78. As shown in FIG. 11, the converging part of this groove normally will be cut to uniform optimum width W by use of a cutter 19a analogous to that of FIG. 2. As in the case of FIGS. 5 and 6, the inner part of the weld will be formed preferably at a single pass, as indicated at 79, FIG. 12. The remaining portion of the weld, indicated by dotted lines at 80, will be formed later in any suitable manner, either by automatic mechanism or manually.

In summary, it will be noted that the present process involves the formation of butt joints between pipe sections, plates and other shapes having wall thicknesses too great for single pass flow but utilizing the single pass narrow groove welding principle which has been modified as required for extension to such thick shapes. The process involves the provision of a wide entrance on at least one outer surface, the formation of a relatively narrow space for the first welding pass, or for the first two passes in very thick material, followed by single pass welding of a substantial thickness to make the basic joint, the full weld being completed by additional passes as necessary.

Other modifications will suggest themselves to those skilled in the art and it is intended to cover such so far as the following claims permit in view of the prior art.

What is claimed is:

1. A method of welding butt joints between adjoining shapes of relatively thick wall section, which thickness is too great for single pass thin wire electrode welding, which comprises bringing said shapes into substantial abutment, providing a relatively wide entrance on at least one outer surface between said abutting shapes, preparing a relatively narrow kerf of substantially uniform width between the inner substantially abutting portions of said shapes, welding said inner portions together in a single pass by feeding a thin wire electrode between them and applying a substantially continuous electric arc thereto, and subsequently welding said widened entrance with additional material in a separate welding step.

2. Method according to claim 1 wherein the narrow kerf is prepared by an abrasive cutting operation.

3. A method of forming girth joints between the abutting end portions of relatively thick wall pipe sections, which comprises bringing said sections into end-to-end relationship and into substantial abutment, providing a wide entrance around the outer peripheral surface into said joint, forming a relatively narrow kerf of substantially uniform width between the substantially abutting inner annular end surfaces of said pipe sections to form a welding gap of highly uniform width throughout the periphery, welding said narrow gap in a single pass operation by feeding continuously a relatively thin wire electrode and maintaining a substantially continuous electric arc within said narrow gap, and subsequently filling said entrance with additional welding material in a separate welding step.

4. A method according to claim 3 wherein the narrow kerf is formed by an abrasive cutting operation.

5. A method of welding girth joints between abutting end sections of thick wall pipe which comprises providing a rebate or cutout portion on at least one of said sections around its exterior portion, providing an annular surface substantially perpendicular to the pipe axes interiorly of said rebated portion, forming a narrow welding gap of uniform thickness less than its depth between said perpendicular annular surfaces, uniting said annular perpendicular surfaces in a single pass welding operation and subsequently filling in between said rebated portions to complete the weld.

6. The method of welding thick shapes which comprises forming a rebate on each outer surface of said shape with a relatively raised land portion between said rebates, bringing said raised land portions into substantial abutment, providing a narrow uniform spacing between said raised land portions suitable for single pass welding, joining said raised portions by feeding a thin wire electrode between them and maintaining a continuous electric arc between them, and subsequently filling in the rebated areas on both sides of said welded raised areas.

7. Method according to claim 6 wherein the narrow uniform spacing is prepared by an abrasive cutting operation.

8. Method according to claim 6 wherein the joining of said raised portions is accomplished in a single pass operation.

References Cited in the file of this patent
UNITED STATES PATENTS
2,945,942   Flynn et al. _____ July 19, 1960